(12) United States Patent
Eatmon

(10) Patent No.: US 6,439,630 B1
(45) Date of Patent: Aug. 27, 2002

(54) GARDEN IMPLEMENT SYSTEM

(76) Inventor: Delton R. Eatmon, 1123 Parkside Dr., NW., Wilson, NC (US) 27896

( * ) Notice: Subject to any disclaimer, the term of this patent is extended or adjusted under 35 U.S.C. 154(b) by 0 days.

(21) Appl. No.: 09/801,334

(22) Filed: Mar. 7, 2001

(51) Int. Cl.$^7$ ................................. A01B 1/22; B25F 1/02
(52) U.S. Cl. ................................. 294/51; 7/114; 206/374
(58) Field of Search .......................... 294/49, 51, 52, 294/57, 59; 7/114, 115, 116; 172/371, 375; 206/223, 349, 372–375; 211/70.6

(56) References Cited

U.S. PATENT DOCUMENTS

| | | | | |
|---|---|---|---|---|
| 1,530,225 A | * | 3/1925 | Belakoy | 294/51 X |
| 2,554,680 A | * | 5/1951 | Morris et al. | 206/374 |
| 3,226,149 A | * | 12/1965 | McJohnson | 294/51 X |
| 3,878,939 A | * | 4/1975 | Wilcox | 206/373 |
| 4,606,089 A | * | 8/1986 | King | 294/51 X |
| 4,786,095 A | * | 11/1988 | Dumont | 294/51 |
| 5,097,909 A | | 3/1992 | Jauhal et al. | 172/371 |
| 5,120,098 A | | 6/1992 | Childress | 294/49 |
| 5,145,064 A | * | 9/1992 | Chen | 206/373 X |
| 5,486,027 A | | 1/1996 | Dionne et al. | 294/51 |
| 5,676,412 A | | 10/1997 | Kahley | 294/53.5 |
| 5,795,000 A | | 8/1998 | Aldrasi | 294/57 |
| 5,799,996 A | | 9/1998 | Fredrickson | 294/51 |

* cited by examiner

Primary Examiner—Johnny D. Cherry
(74) Attorney, Agent, or Firm—Joseph N. Breaux

(57) ABSTRACT

A garden implement system that includes a case for storing and transporting various garden implements needed at various times while gardening. The garden implement system includes a two-part, hingedly connected, foam-lined container; a garden trowel; a number of garden implement heads including a shovel head, a hoe head, and a rake head; and a telescoping handle having a bottom end that is securable to an attachment fitting provided on the shovel head, the hoe head, and the rake head.

1 Claim, 2 Drawing Sheets

GARDEN IMPLEMENT SYSTEM

TECHNICAL FIELD

The present invention relates to gardening equipment and more particularly to a garden implement system that includes a two-part, hingedly connected, foam-lined container with two foam liner members provided therein, a garden trowel and a number of garden implement heads including a shovel head, a hoe head, and a rake head, and a telescoping handle having a bottom end that is securable to an attachment fitting provided on the shovel head, the hoe head, and the rake head; the foam lined container including two half-tubular handle gripping structures, attached to adjacent side edges of the two-part foam lined container, and two container handle sections each provided atop one of the two half-tubular handle gripping structure such that when the two-part foam lined container is in the closed position, the two half-tubular handle gripping structures are positioned adjacent to each other in a manner to form a tubular handle gripping assembly and the two container handle sections are positioned together to form a carrying handle for the two-part foam lined container; one of the foam liner members having shaped cavities provided therein for receiving therein the shovel head, the garden trowel and the hoe head; the two container handle sections each including a padlock plate such that when the two container handle sections are positioned next to each other, a padlock may be passed through the padlock plates to lock the two-part foam lined container in the closed position and the telescoping handle between the two half-tubular handle gripping structures.

BACKGROUND ART

Gardening is a pleasant pastime enjoyed by many. Gardening does, however, require the use of a number of tools that can be difficult to keep track of and find when they are most needed. It would be desirable, therefore, to have a garden implement system that included a case for storing and transporting the various garden implements needed at various times while gardening.

GENERAL SUMMARY DISCUSSION OF INVENTION

It is thus an object of the invention to provide a garden implement system that includes a two-part, hingedly connected, foam-lined container with two foam liner members provided therein, a garden trowel and a number of garden implement heads including a shovel head, a hoe head, and a rake head, and a telescoping handle having a bottom end that is securable to an attachment fitting provided on the shovel head, the hoe head, and the rake head; the foam lined container including two half-tubular handle gripping structures, attached to adjacent side edges of the two-part foam lined container, and two container handle sections each provided atop one of the two half-tubular handle gripping structure such that when the two-part foam lined container is in the closed position, the two half-tubular handle gripping structures are positioned adjacent to each other in a manner to form a tubular handle gripping assembly and the two container handle sections are positioned together to form a carrying handle for the two-part foam lined container; one of the foam liner members having shaped cavities provided therein for receiving therein the shovel head, the garden trowel and the hoe head; the two container handle sections each including a padlock plate such that when the two container handle sections are positioned next to each other, a padlock may be passed through the padlock plates to lock the two-part foam lined container in the closed position and the telescoping handle between the two half-tubular handle gripping structures.

Accordingly, a garden implement system is provided. The garden implement system includes a two-part, hingedly connected, foam-lined container with two foam liner members provided therein, a garden trowel and a number of garden implement heads including a shovel head, a hoe head, and a rake head, and a telescoping handle having a bottom end that is securable to an attachment fitting provided on the shovel head, the hoe head, and the rake head; the foam lined container including two half-tubular handle gripping structures, attached to a adjacent side edges of the two-part foam lined container, and two container handle sections each provided atop one of the two half-tubular handle gripping structure such that when the two-part foam lined container is in the closed position, the two half-tubular handle gripping structures are positioned adjacent to each other in a manner to form a tubular handle gripping assembly and the two container handle sections are positioned together to form a carrying handle for the two-part foam lined container; one of the foam liner members having shaped cavities provided therein for receiving therein the shovel head, the garden trowel and the hoe head; the two container handle sections each including a padlock plate such that when the two container handle sections are positioned next to each other, a padlock may be passed through the padlock plates to lock the two-part foam lined container in the closed position and the telescoping handle between the two half-tubular handle gripping structures. Other items may also be carried in the two-part, hingedly connected, foam-lined container according to a particular gardeners needs including items such as garden shears, a foam kneeling matt, etc. In addition, if desired, the system can be provided with stick-on letters so that the gardener can personalize the container.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
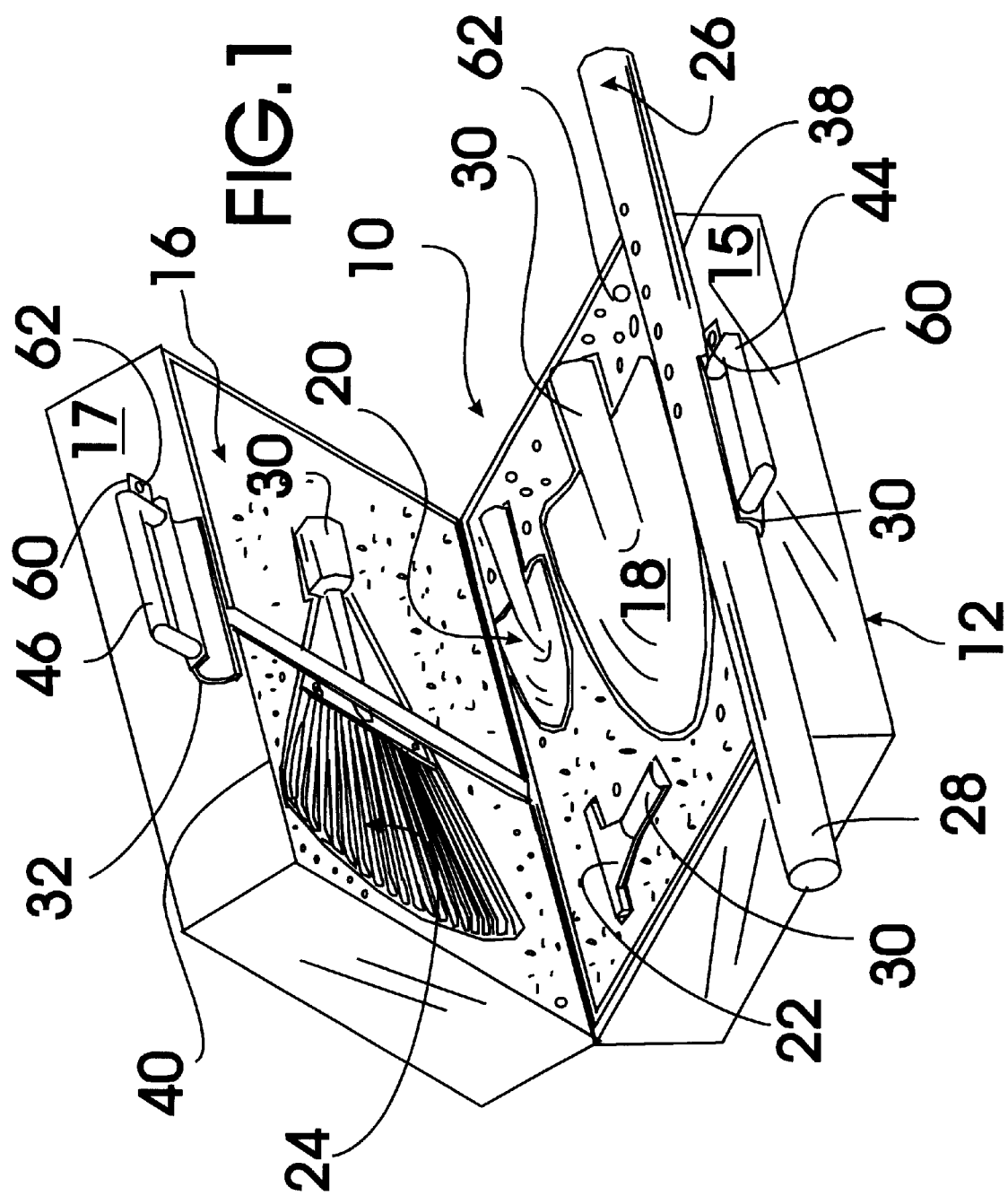
FIG. 1 is a perspective view of an exemplary embodiment of the garden implement system of the present invention.
Figure 2:
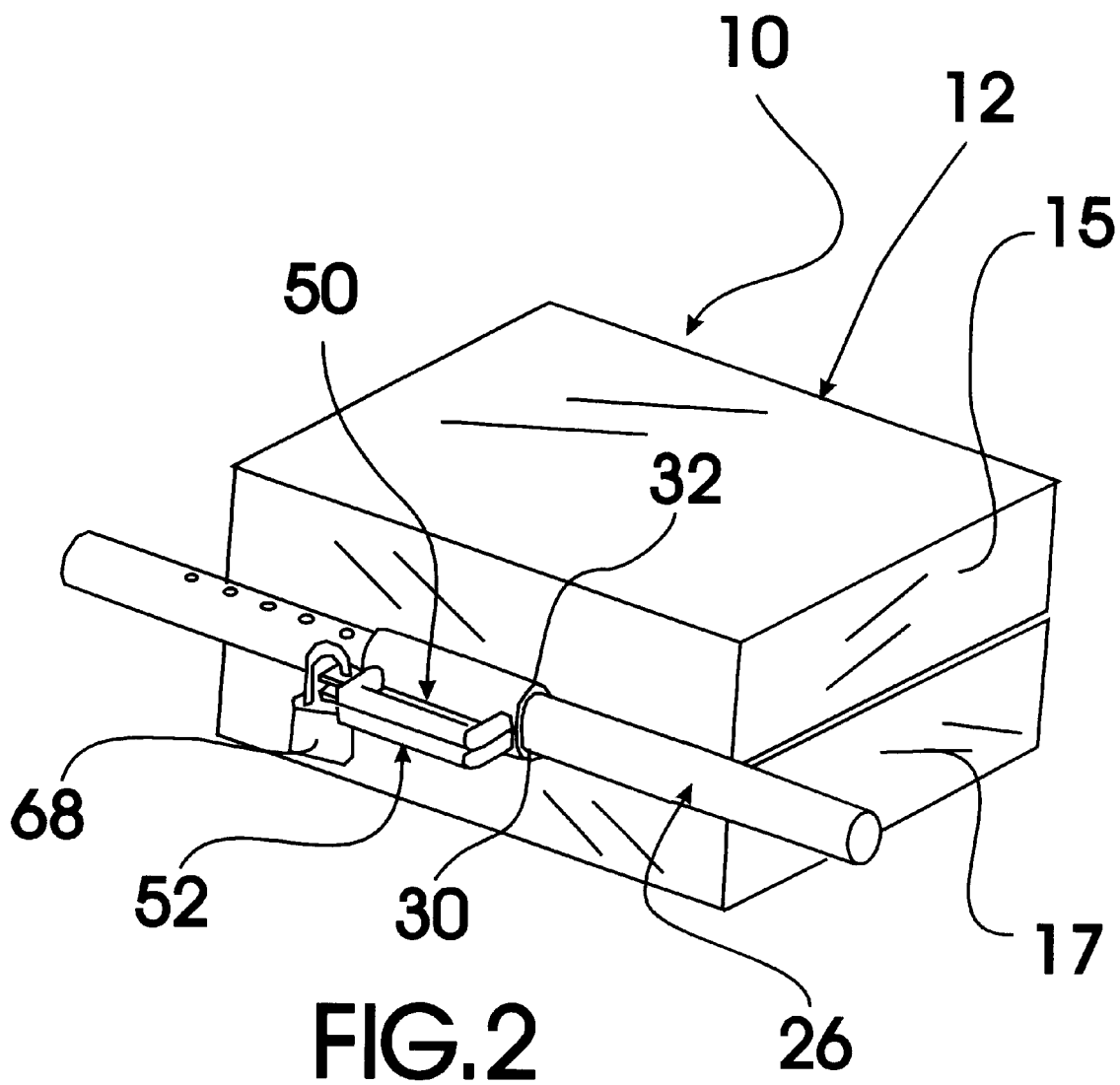
FIG. 2 is a second perspective view of the garden implement system of FIG. 1.

FIGS. 1 and 2 show various aspects of an exemplary embodiment of the garden implement system of the present invention generally designated 10. Garden implement system 10 includes a two-part, hingedly connected, foam-lined container, generally designated 12, with two foam liner members 14,16 each provided within a container member 15,17; a garden trowel, generally designated 20; a number of garden implement heads including a shovel head, generally designated 18; a hoe head, generally designated 22; a rake head, generally designated 24; and a telescoping handle, generally designated 26, having a bottom end 28 that is securable to an attachment fitting 30 provided on shovel head 18, hoe head 22, and rake head 24. Foam liner member 14 has shaped cavities 56 provided therein for receiving therein shovel head 18, garden trowel 20 and hoe head 22.

Foam lined container 12 includes two half-tubular handle gripping structures 30,32, attached to adjacent side edges 38,40 of the two-part foam lined container 12, and two container handle sections 44,46 each provided atop one of the two half-tubular handle gripping structure 30,32 such that when the two container members 15,17 of two-part foam lined container 12 are closed together (as shown in FIG. 2), the two half-tubular handle gripping structures 30,32 are positioned adjacent to each other in a manner to form a tubular handle gripping assembly 50 and the two container handle sections 44,46 are positioned together to form a carrying handle 52 for two-part foam lined container 12. Each of the two container handle sections 44,46 includes a padlock plate 60 with a lock hole 62 positioned such that when the two container handle sections 44,46 are positioned next to each other (see FIG. 2), a padlock 68 may be passed through the lock holes 62 of the padlock plates 60 to lock the two-part foam lined container 12 in the closed position and the telescoping handle between the two half-tubular handle gripping structures 30,32.

It can be seen from the preceding description that a garden implement system has been provided.

It is noted that the embodiment of the garden implement system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A garden implement system comprising:

a two-part, hingedly connected, foam-lined container with two foam liner members provided therein;

a garden trowel;

a number of garden implement heads including a shovel head, a hoe head, and a rake head; and a telescoping handle having a bottom end that is securable to an attachment fitting provided on the shovel head, the hoe head, and the rake head;

the foam lined container including two half-tubular handle gripping structures, attached to adjacent side edges of the two-part foam lined container, and two container handle sections each provided atop one of the two half-tubular handle gripping structures such that when the two-part foam lined container is in the closed position, the two half-tubular handle gripping structures are positioned adjacent to each other in a manner to form a tubular handle gripping assembly and the two container handle sections are positioned together to form a carrying handle for the two-part foam lined container;

one of the foam liner members having shaped cavities provided therein for receiving therein the shovel head, the garden trowel and the hoe head;

the two container handle sections each including a padlock plate having a lock hole provided therethrough such that when the two container handle sections are positioned next to each other, a padlock may be passed through the lock holes of the padlock plates to lock the two-part foam lined container in the closed position and the telescoping handle between the two half-tubular handle gripping structures.

* * * * *